US012572023B2

(12) United States Patent
Lee et al.

(10) Patent No.: US 12,572,023 B2
(45) Date of Patent: Mar. 10, 2026

(54) OPTICAL NAVIGATION DEVICE WITH INCREASED DEPTH OF FIELD

(71) Applicant: PIXART IMAGING INC., Hsin-Chu County (TW)

(72) Inventors: Sai-Mun Lee, Penang (MY); Hun-Kwang Lee, Penang (MY); Yee-Loong Chin, Penang (MY); Chee-Pin T'Ng, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 815 days.

(21) Appl. No.: 17/966,891

(22) Filed: Oct. 17, 2022

(65) Prior Publication Data

US 2024/0126092 A1    Apr. 18, 2024

(51) Int. Cl.
*G02B 27/09* (2006.01)
*G01S 7/481* (2006.01)

(52) U.S. Cl.
CPC ........ *G02B 27/0955* (2013.01); *G01S 7/4815* (2013.01)

(58) Field of Classification Search
USPC .......................................... 356/499; 345/166
See application file for complete search history.

(56) References Cited

U.S. PATENT DOCUMENTS

| | | | | |
|---|---|---|---|---|
| 10,976,560 B2* | 4/2021 | Lee | ................... | G02B 27/0916 |
| 11,886,649 B2* | 1/2024 | Lee | ....................... | G06F 3/0304 |
| 2005/0094154 A1* | 5/2005 | Baney | ................. | G06F 3/03544 |
| | | | | 356/499 |
| 2005/0231465 A1* | 10/2005 | DePue | ..................... | G01D 5/30 |
| | | | | 345/156 |
| 2007/0091064 A1* | 4/2007 | Cheah | ................... | G06F 3/0317 |
| | | | | 345/156 |
| 2007/0285392 A1* | 12/2007 | Lee | ....................... | G06F 3/0317 |
| | | | | 345/166 |

* cited by examiner

*Primary Examiner* — Nathnael Aynalem

(74) *Attorney, Agent, or Firm* — HAUPTMAN HAM, LLP

(57) ABSTRACT

There is provided an optical navigation device including a substrate, a light sensor, a first light source, a second light source and a light directing member. The light sensor is arranged on the substrate and has a field of view (FOV) perpendicular to the substrate. The emission light of the first light source forms a first illumination light beam after passing the light directing member. The emission light of the second light source forms a second illumination light beam after passing the light directing member. A first crossover region of the first illumination light beam with the FOV is closer to the substrate than a second crossover region of the second illumination light beam with the FOV.

25 Claims, 5 Drawing Sheets

200

200

300

OPTICAL NAVIGATION DEVICE WITH INCREASED DEPTH OF FIELD

BACKGROUND

1. Field of the Disclosure

This disclosure generally relates to a navigation device and, more particularly, to a navigation device that adopts multiple light sources to increase a field of view thereof.

2. Description of the Related Art

Please refer to FIG. 1, it is a conventional navigation device 100 including a light source 11, a light sensor 13, a first lens 151 and a second lens 153. After passing the first lens 151, emission light of the light source 11 forms a collimated light beam 11L refracted toward a direction of the light sensor 13. A field of view (FOV) of the light sensor 13 is refracted toward a direction of the light source 11 after passing the second lens 153 so as to receive specular reflection light of the collimated light beam 11L reflected by a work surface.

A longitudinal height between a first crossover point CVP1 and a second crossover point CVP2 between a center line 13C of the FOV of the light sensor 13 and the collimated light beam 11L determines a depth of field (DOF) of the navigation device 100.

It is seen from FIG. 1 that because a width of the collimated light beam 11L is limited, the DOF of the navigation device 100 is also limited thereby.

Accordingly, the present disclosure provides an optical navigation device having an improved working depth of field by adopting multiple light sources.

SUMMARY

The present disclosure provides an optical navigation device arranged with multiple light sources at the same side of a light sensor, wherein crossover regions of illumination light beams of the multiple light sources with a field of view of the light sensor have different longitudinal heights.

The present disclosure further provides an optical navigation device arranged with multiple light sources at different sides of a light sensor, wherein crossover regions of illumination light beams of the multiple light sources with a field of view of the light sensor have different longitudinal heights.

The present disclosure provides an optical navigation device including a substrate, a light directing member, a light sensor, a first light source and a second light source. The light sensor is arranged on the substrate and having a field of view (FOV) perpendicular to the substrate. The first light source is arranged on the substrate, and emission light thereof is refracted by the light directing member to propagate toward the light sensor after passing the light directing member to form a first illumination light beam, which has a first crossover region with the FOV. The second light source is arranged on the substrate at a same side of the light sensor with the first light source, and emission light of the second light source is refracted by the light directing member to propagate toward the light sensor after passing the light directing member to form a second illumination light beam, which has a second crossover region with the FOV. The first crossover region is closer to the substrate than the second crossover region.

The present disclosure further provides an optical navigation device including a substrate, a light directing member, a light sensor, a first light source and a second light source. The light sensor is arranged on the substrate and having a field of view (FOV) perpendicular to the substrate. The first light source is arranged on the substrate, and emission light thereof is refracted by the light directing member to propagate toward the light sensor after passing the light directing member to form a first illumination light beam, which has a first crossover region with the FOV. The second light source is arranged on the substrate at different sides of the light sensor from the first light source, and emission light of the second light source is refracted by the light directing member to propagate toward the light sensor after passing the light directing member to form a second illumination light beam, which has a second crossover region with the FOV. The first crossover region is closer to the substrate than the second crossover region.

The present disclosure further provides an optical navigation device including a substrate, a light directing member, a light sensor, a first light source and a second light source. The light directing member includes a first optical structure and a second optical structure formed individually from each other. The light sensor is arranged on the substrate and having a field of view (FOV) perpendicular to the substrate. The first light source is arranged on the substrate, and emission light thereof is refracted by the light directing member to propagate toward the light sensor after passing the light directing member to form a first illumination light beam. The second light source is arranged on the substrate, and emission light thereof is refracted by the light directing member to propagate toward the light sensor after passing the light directing member to form a second illumination light beam. When a work surface is within a first working range, a first illumination area of the first illumination light beam on the work surface is closer to an FOV center of the light sensor than a second illumination area of the second illumination light beam on the work surface. When the work surface is within a second working range, the first illumination area of the first illumination light beam on the work surface is farther away from the FOV center of the light sensor than the second illumination area of the second illumination light beam on the work surface, wherein the first working range is closer to the substrate than the second working range.

The present disclosure provides an optical navigation device including a substrate, a light directing member, a light sensor, a first light source and a second light source. The light sensor is arranged on the substrate and having a field of view (FOV) perpendicular to the substrate. The first light source is arranged on the substrate and has a first transverse distance from the light sensor, and emission light thereof is refracted by the light directing member to propagate toward the light sensor after passing the light directing member to form a first illumination light beam, which has a first crossover region with the FOV. The second light source is arranged on the substrate at the same side of the light sensor as the first light source and has a second transverse distance, larger than the first transverse distance, from the light sensor, and emission light of the second light source is refracted by the light directing member to propagate toward the light sensor after passing the light directing member to form a second illumination light beam, which has a second crossover region with the FOV. The first crossover region is farther away from the substrate than the second crossover region.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

One objective of the present disclosure is to provide an optical navigation device with a longer working depth of field (DOF) by arranging multiple light sources surrounding a light sensor. The light sensor is preferably arranged to receive diffuse reflection light, instead of specular reflection light, from a work surface by reflecting illumination light beams. In the present disclosure, the work surface is, for example, a table surface, a skin surface, a mouse pad surface or other surfaces for reflecting light.

Figure 1:
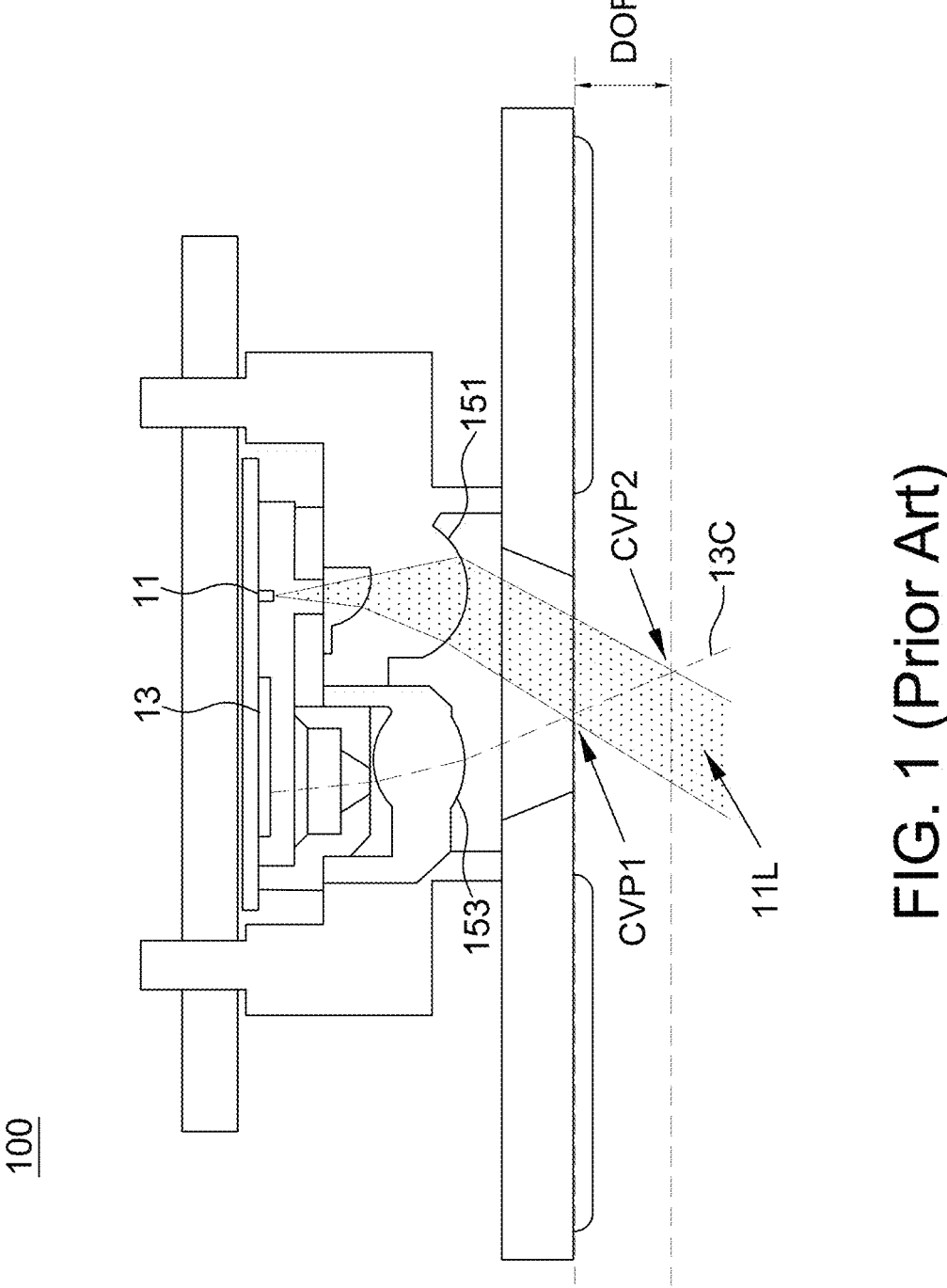
FIG. 1 is a schematic diagram of a conventional navigation device.
Figure 2:
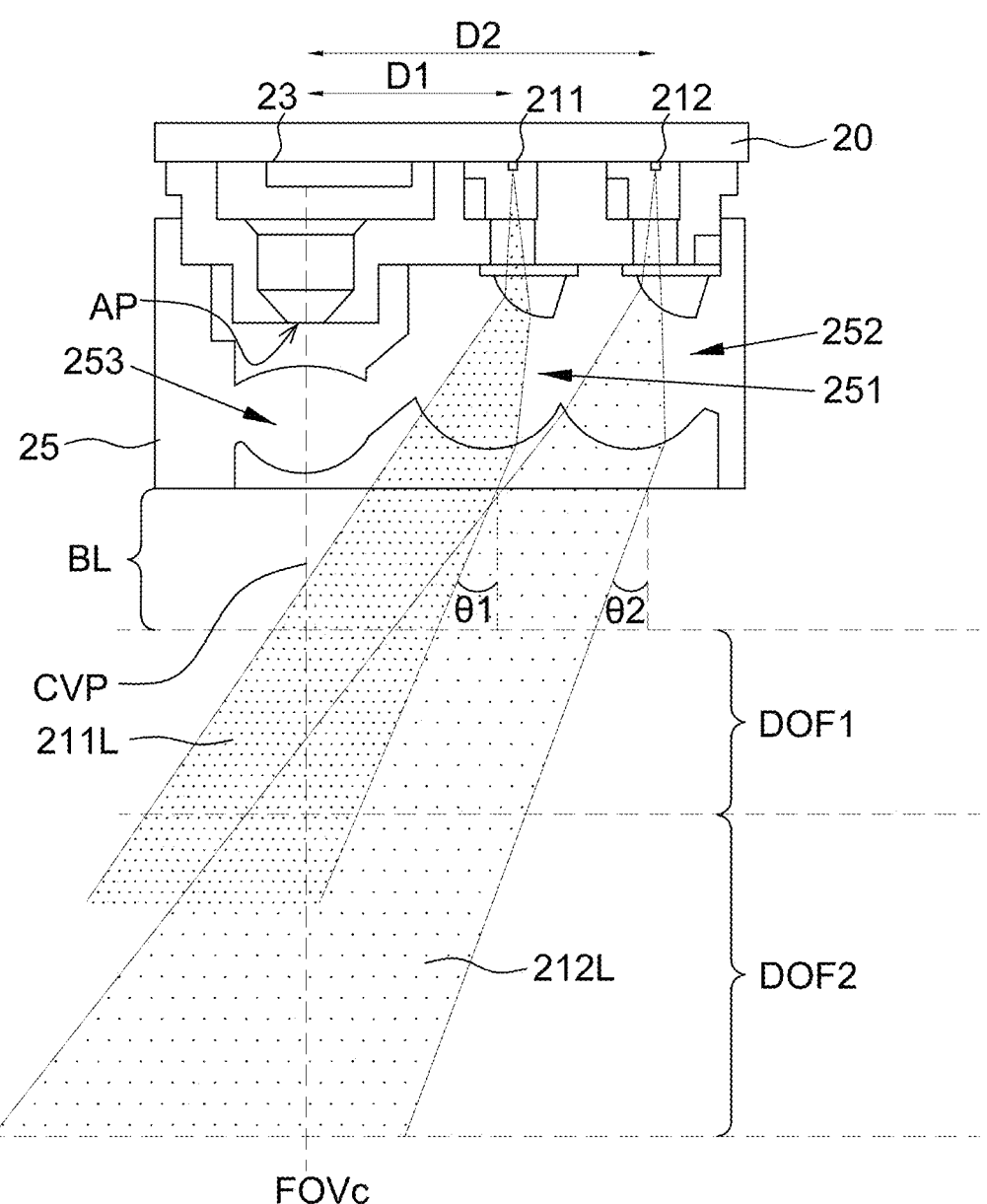
FIG. 2 is a schematic diagram of an optical navigation device according to a first embodiment of the present disclosure.

Please refer to FIG. 2, it is a schematic diagram of an optical navigation device 200 according to a first embodiment of the present disclosure. The optical navigation device 200 includes a substrate 20, a first light source 211, a second light source 212, a light sensor 23 and a light directing member 25, wherein the first light source 211, the second light source 212 and the light sensor 23 are arranged on the substrate 20 and electrically connected thereto. The first 211 and the second light source 212 are at the same side of the light sensor 23, e.g., shown as a right hand side, but not limited to the right hand side.

The substrate 20 is selected from a printed circuit board (PCB) and a flexible board, but not limited thereto.

The light sensor 23 is, for example, a complementary metal oxide semiconductor (CMOS) image sensor, a charge-coupled device (CCD) image sensor or a single photon avalanche diode (SPAD) sensor. The light sensor 23 has a field of view (FOV) perpendicular to the substrate 20. FIG. 2 shows a center line FOVc of the field of view of the light sensor 23. A range of the FOV is determined by an aperture AP.

The first light source 211 is selected from a coherent light source (e.g., light emitting diode) and a non-coherent light source (e.g., laser diode) without particular limitations. Emission light of the first light source 211 is refracted by the light directing member 25 to propagate toward the light sensor 23 after passing the light directing member 25 to form a first illumination light beam 211L, which has a first crossover region (e.g., a longitudinal region that FOVc inside 211L) with the FOV of the light sensor 23.

The second light source 212 is also selected from a coherent light source and a non-coherent light source without particular limitations. Emission light of the second light source 212 is refracted by the light directing member 25 to propagate toward the light sensor 23 after passing the light directing member 25 to form a second illumination light beam 212L, which has a second crossover region (e.g., a longitudinal region that FOVc inside 212L) with the FOV of the light sensor 23.

The emission light of the first light source 211 has a wavelength identical to or different from the emission light of the second light source 212 without particular limitations. The emission light of the first light source 211 has intensity identical to or different from intensity of the second light source 212, e.g., the intensity of emission light of the second light source 212 is higher than the intensity of emission light of the first light source 211. The first light source 211 and the second light source 212 emit light simultaneously or sequentially without particular limitations.

The light directing member 25 includes a first optical structure 251, a second optical structure 252 and a lens member 253. In one aspect, the first optical structure 251, the second optical structure 252 and the lens member 253 are formed integrally, e.g., manufactured by injection molding using glass or plastic, but not limited thereto. In another aspect, the first optical structure 251, the second optical structure 252 and the lens member 253 are individually manufactured components, which are combined together to form the light directing member 25. In an alternative aspect, at least one of the first optical structure 251, the second optical structure 252 and the lens member 253 is a separated component from the other(s).

The first optical structure 251 and the second optical structure 252 are selected from a collimating lens, a non-collimating lens, a combination of a convex lens and an optical wedge, a combination of a convex lens and a multi-facet lens, a combination of a Fresnel lens and a multi-facet lens, and a combination of a Fresnel lens and a Fresnel lens.

In one aspect, the lens member 253 is opposite to the light sensor 23, and an optical axis of the lens member 253 is perpendicular to the substrate 20, e.g., FIG. 2 showing centers of an upper convex lens and a lower convex lens are aligned with the light sensor 23 and the aperture AP. That is, the FOV of the light sensor 23 is not refracted by the lens member 253. The lens member 253 is a biconvex lens or a plano-convex lens for converging reflected light from a work surface.

The emission light of the first light source 211 forms a first illumination light beam 211L after passing the first optical structure 251. The emission light of the second light source 212 forms a second illumination light beam 212L after passing the second optical structure 252. In this embodiment, an incident surface and an exit surface of the first optical structure 251 are different from an incident surface and an exit surface of the second optical structure 252. That is, only the emission light of the first light source 211 goes through the incident surface and the exit surface of the first optical structure 251, and only the emission light of the second light source 212 goes through the incident surface and the exit surface of the second optical structure 252. Meanwhile, the emission lights (referring to main beam) of the first light source 211 and the second light source 232 do not overlap with each other inside the light directing member 25.

In the first embodiment, to increase a total depth of field (DOF) of the optical navigation device 200, the first crossover region is closer to the substrate 20 than the second crossover region, e.g., respectively forming a first depth of field DOF1 and a second depth of field DOF2. The total DOF of the optical navigation device 200 is equal to DOF1+DOF2. It should be mentioned that lengths of DOF1 and DOF2 are not limited to those shown in FIG. 2.

Furthermore, a crossover point (e.g., the highest position) between the first crossover region and the FOV (e.g., shown by the center line FOVc) is at a predetermined distance under a bottom surface of the light directing member 25 so as to determine a minimum working DOF of the optical navigation device 200. That is, when a work surface is above the minimum work DOF (e.g., shown as a BL region), reflected light from the work surface does not enter the aperture AP of the light sensor 23 and thus is not received by the light sensor 23.

One configuration for implementing the DOF1 and the DOF2 is to arrange the optical navigation device 200 as: the first light source 211 and the light sensor 23 having a first transverse distance D1; the second light source 212 and the light sensor 23 having a second transverse distance D2; the first transverse distance D1 is smaller than the second transverse distance D2; and a first included angle θ1 between the first illumination light beam 211L and a normal (e.g., vertical line in FIG. 2) of the substrate 20 is different from a second included angle θ2 between the second illumination light beam 212L and the normal of the substrate 20. In this way, DOF1+DOF2 is increased. In another aspect, the first included angle θ1 is identical to the second included angle θ2.

Figure 3:
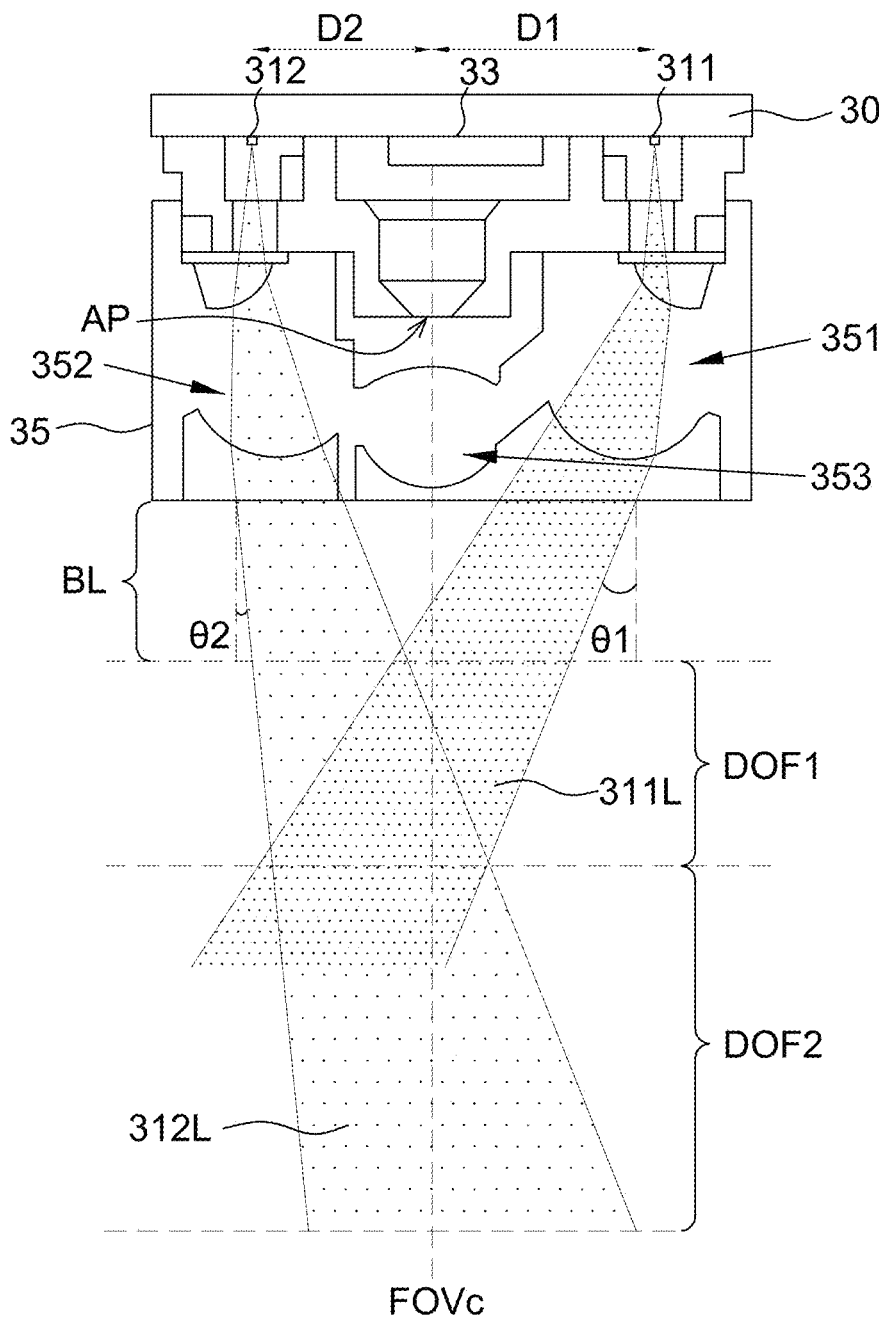
FIG. 3 is a schematic diagram of an optical navigation device according to a second embodiment of the present disclosure.

Please refer to FIG. 3, it is a schematic diagram of an optical navigation device 300 according to a second embodiment of the present disclosure. The optical navigation device 300 includes a substrate 30, a first light source 311, a second light source 312, a light sensor 33 and a light directing member 35, wherein the first light source 311, the second light source 312 and the light sensor 33 are arranged on the substrate 30 and electrically connected thereto. The first 311 and the second light source 312 are at different sides of the light sensor 33, e.g., shown as right and left hand sides, but not limited to opposite sides.

The substrate 30 is selected from a printed circuit board and a flexible board, but not limited thereto.

The light sensor 33 is, for example, a CMOS image sensor, a CCD image sensor or a SPAD sensor. The light sensor 33 has a field of view perpendicular to the substrate 30. FIG. 3 shows a center line FOVc of the field of view (FOV) of the light sensor 33. A range of the FOV is determined by an aperture AP.

The first light source 311 is selected from a coherent light source and a non-coherent light source without particular limitations. Emission light of the first light source 311 refracted toward (shown as toward left) the light sensor 33 after passing the light directing member 35 to form a first illumination light beam 311L, which has a first crossover region (e.g., a longitudinal region that FOVc inside 311L) with the FOV of the light sensor 33.

The second light source 312 is also selected from a coherent light source and a non-coherent light source without particular limitations. Emission light of the second light source 312 refracted toward (shown as toward right) the light sensor 33 after passing the light directing member 35 to form a second illumination light beam 312L, which has a second crossover region (e.g., a longitudinal region that FOVc inside 312L) with the FOV of the light sensor 33.

The emission light of the first light source 311 has a wavelength identical to or different from the emission light of the second light source 312 without particular limitations. The emission light of the first light source 311 has intensity identical to or different from intensity of the second light source 312, e.g., the intensity of emission light of the second light source 312 is higher than the intensity of emission light of the first light source 311. The first light source 311 and the second light source 312 emit light simultaneously or sequentially without particular limitations.

The light directing member 35 includes a first optical structure 351, a second optical structure 352 and a lens member 353. In one aspect, the first optical structure 351, the second optical structure 352 and the lens member 353 are formed integrally, e.g., manufactured by injection molding using glass or plastic, but not limited thereto. In another aspect, the first optical structure 351, the second optical structure 352 and the lens member 353 are individually manufactured components, which are combined together to form the light directing member 35. In an alternative aspect, at least one of the first optical structure 351, the second optical structure 352 and the lens member 353 is a separated component from the other(s).

The first optical structure 351 and the second optical structure 352 are selected from a collimating lens, a non-collimating lens, a combination of a convex lens and an optical wedge, a combination of a convex lens and a multi-facet lens, a combination of a Fresnel lens and a multi-facet lens, and a combination of a Fresnel lens and a Fresnel lens.

In one aspect, the lens member 353 is opposite to the light sensor 33, and an optical axis of the lens member 353 is perpendicular to the substrate 30, e.g., FIG. 3 showing centers of an upper convex lens and a lower convex lens are aligned with the light sensor 33 and the aperture AP. That is, the FOV of the light sensor 33 is not refracted by the lens member 353. The lens member 353 is a biconvex lens or a plano-convex lens for converging reflected light from a work surface.

The emission light of the first light source 311 forms a first illumination light beam 311L after passing the first optical structure 351. The emission light of the second light source 312 forms a second illumination light beam 312L after passing the second optical structure 352. In this embodiment, an incident surface and an exit surface of the first optical structure 351 are different from an incident surface and an exit surface of the second optical structure 352. That is, only the emission light of the first light source 311 goes through the incident surface and the exit surface of the first optical structure 351, and only the emission light of the second light source 312 goes through the incident surface and the exit surface of the second optical structure 352. Meanwhile, the emission lights (referring to main beam) of the first light source 311 and the second light source 332 do not overlap with each other inside the light directing member 35.

In the second embodiment, to increase a total depth of field (DOF) of the optical navigation device 300, the first crossover region is closer to the substrate 30 than the second crossover region, e.g., respectively forming a first depth of field DOF1 and a second depth of field DOF2. The total DOF of the optical navigation device 300 is equal to DOF1+DOF2. It should be mentioned that lengths of DOF1 and DOF2 are not limited to those shown in FIG. 3.

Furthermore, a crossover point (e.g., the highest position) between the first crossover region and the FOV (e.g., shown by the center line FOVc) is at a predetermined distance under a bottom surface of the light directing member 35 so as to determine a minimum working DOF of the optical navigation device 300. That is, when a work surface is above the minimum work DOF (e.g., shown as a BL region), reflected light from the work surface does not enter the aperture AP of the light sensor 33 and thus is not received by the light sensor 33.

One configuration for implementing the DOF and the DOF2 is to arrange the optical navigation device 300 as: the first light source 311 and the light sensor 33 having a first transverse distance D1; the second light source 312 and the light sensor 33 having a second transverse distance D2; the first transverse distance D1 is equal to the second transverse distance D2; and a first included angle θ1 between the first illumination light beam 311L and a normal (e.g., vertical line in FIG. 3) of the substrate 30 is larger than a second included angle θ2 between the second illumination light beam 312L and the normal of the substrate 30.

In another aspect, the first transverse distance D1 is smaller than the second transverse distance D2; and a first included angle θ1 between the first illumination light beam 311L and a normal of the substrate 30 is equal to a second included angle θ2 between the second illumination light beam 312L and the normal of the substrate 30.

However, the present disclosure is not limited thereto. The way to form DOF1 and DOF2 at different longitudinal heights by arranging the transverse distance between the light source and the light sensor, arranging the refraction angle of the light directing member, and arranging the emission angle of the light source is not departed from the spirit and scope of the disclosure.

As mentioned in the first embodiment and the second embodiment, the optical navigation devices 200, 300 have a first depth of field DOF1 and a second depth of field DOF2. Accordingly, when a work surface is within a first working range (e.g., the range of DOF1), a first illumination area of the first illumination light beam 211L, 311L on the work surface is closer to a center line FOVc of the light sensor 23, 33 than a second illumination area of the second illumination light beam 212L, 312L on the work surface. Whereas, when the work surface is within a second working range (e.g., the range of DOF2), the first illumination area of the first illumination light beam 211L, 311L on the work surface is farther away from the center line FOVc of the light sensor 23, 33 than the second illumination area of the second illumination light beam 212L, 312L on the work surface. The first working range is closer to the substrate 20, 30 than the second working range.

Because the first working range and the second working range are beneath the aperture AP of the light sensor 23, 33, the light sensor 23, 33 receives diffuse reflection light of the first illumination light beam 211L, 311L and the second illumination light beam 212L, 312L.

It should be mentioned that although the first embodiment and the second embodiment are described by using two light sources at left and right sides of the light sensor, they are only intended to illustrate but not to limit the preset disclosure. In other embodiments, multiple light sources are arranged at multiple sides surrounding the light sensor, e.g., left and right sides, front and back sides or a combination thereof.

It should be mentioned that although the first embodiment and the second embodiment are described by using two light sources, they are only intended to illustrate but not to limit the preset disclosure. In other embodiments, the optical navigation device includes more than two light sources that respectively form an illumination region at different longitudinal heights beneath the light sensor to further increase the total DOF of the optical navigation device.

Figure 4:
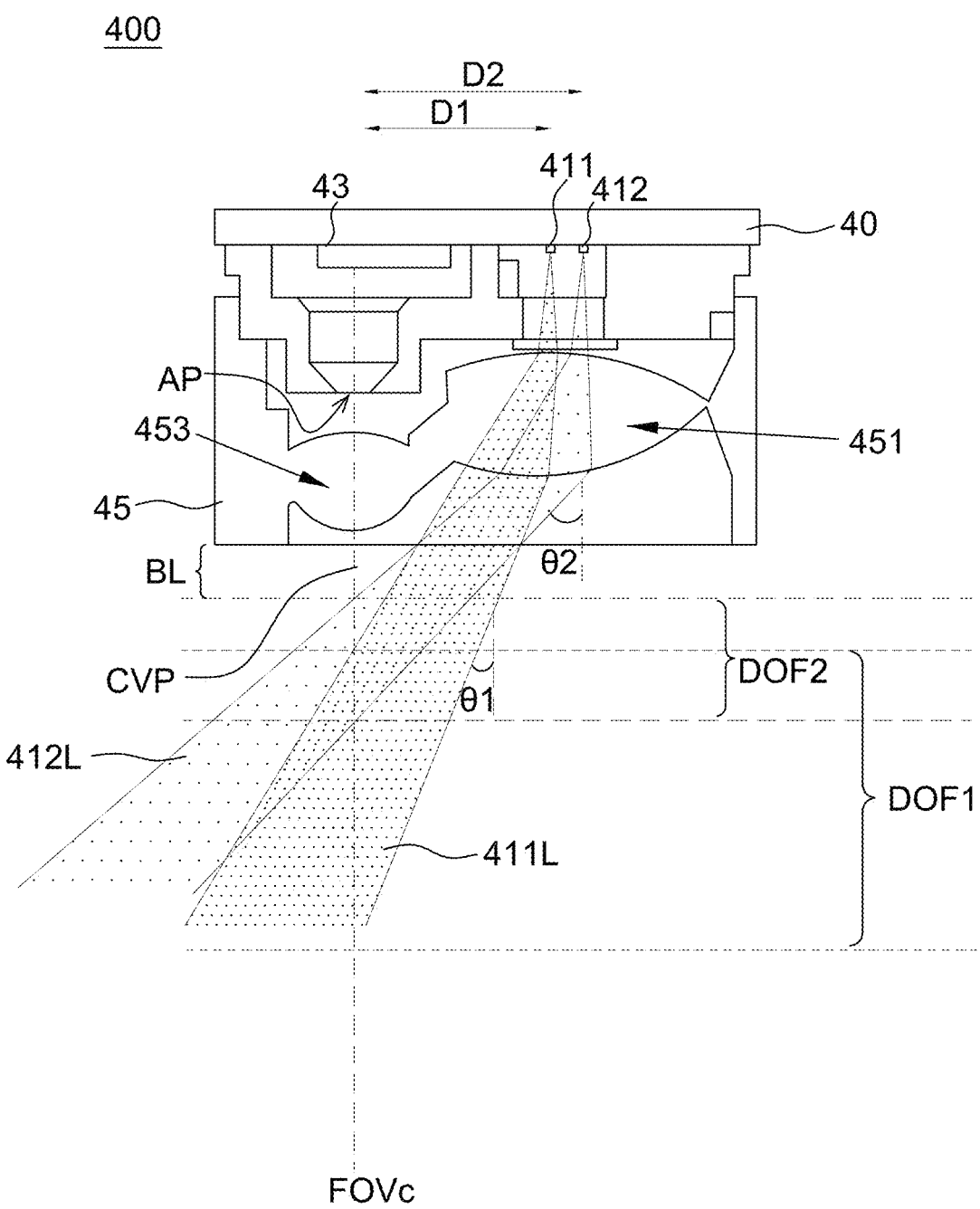
FIG. 4 is a schematic diagram of an optical navigation device according to a third embodiment of the present disclosure.

Please refer to FIG. 4, it is a schematic diagram of an optical navigation device 400 according to a third embodiment of the present disclosure. The optical navigation device 400 includes a substrate 40, a first light source 411, a second light source 412, a light sensor 43 and a light directing member 45, wherein the first light source 411, the second light source 412 and the light sensor 43 are arranged on the substrate 40 and electrically connected thereto. The first 411 and the second light source 412 are at the same side of the light sensor 43, e.g., shown at right hand side, but not limited to the right hand side. The first light source 411 has a first transverse distance D1 from the light sensor 43. The second light source 412 has a second transverse distance D2, larger than the first transverse distance DL, from the light sensor 43.

The substrate 40 is selected from a printed circuit board and a flexible board, but not limited thereto.

The light sensor 43 is, for example, a CMOS image sensor, a CCD image sensor or a SPAD sensor. The light sensor 43 has an FOV perpendicular to the substrate 40. FIG. 4 shows a center line FOVc of the FOV of the light sensor 43 to indicating the FOV. A range of the FOV is determined by an aperture AP.

The first light source 411 is selected from a coherent light source (e.g., light emitting diode) and a non-coherent light source (e.g., laser diode) without particular limitations. Emission light of the first light source 411 is refracted by the light directing member 45 to propagate toward the light sensor 43 (e.g., lower left direction) after passing the light directing member 45 to form a first illumination light beam 411L, which has a first crossover region (e.g., a longitudinal region that FOVc inside 411L. e.g., DOF1) with the FOV of the light sensor 43.

The second light source 412 is selected from a coherent light source and a non-coherent light source without particular limitations. Emission light of the second light source 412 is refracted by the light directing member 45 to propagate toward the light sensor 43 (e.g., lower left direction) after passing the light directing member 45 to form a second illumination light beam 412L, which has a second crossover region (e.g., a longitudinal region that FOVc inside 412L, e.g., DOF2) with the FOV of the light sensor 43.

In this embodiment, the first light source 411 and the second light source 412 are singulated dice attached in an array, a monolithic array of discrete light sources which are electrically isolated, a monolithic array of light sources in continuum which are not electrically isolated, or two independent light sources arranged in parallel to a line connecting the light sensor 43 and the first light source 411.

The emission light of the first light source 411 has a wavelength identical to or different from the emission light of the second light source 412 without particular limitations. The emission light of the first light source 411 has intensity identical to or different from intensity of the second light source 412, e.g., the intensity of emission light of the second light source 412 is lower than the intensity of emission light of the first light source 411. The first light source 411 and the second light source 412 emit light simultaneously or sequentially without particular limitations.

The light directing member 45 includes an optical structure 451 and a lens member 453. In one aspect, the optical structure 451 and the lens member 453 are formed integrally, e.g., manufactured by injection molding using glass or plastic, but not limited thereto. In another aspect, the optical structure 451 and the lens member 453 are individually manufactured components, which are combined together to form the light directing member 45.

The optical structure 451 is selected from a collimating lens, a non-collimating lens, a combination of a convex lens and an optical wedge, a combination of a convex lens and a multi-facet lens, a combination of a Fresnel lens and a multi-facet lens, and a combination of a Fresnel lens and a Fresnel lens, but not limited thereto.

The lens member 453 is opposite to the light sensor 43, and an optical axis of the lens member 453 is perpendicular to the substrate 40, e.g., FIG. 4 showing centers of an upper convex lens and a lower convex lens are aligned with the light sensor 43 and the aperture AP. That is, the FOV of the light sensor 43 is preferably not refracted by the lens member 453. The lens member 453 is a biconvex lens or a plano-convex lens for converging reflected light from a work surface.

The emission light of the first light source 411 forms a first illumination light beam 411L after passing the optical structure 451. The emission light of the second light source 412 forms a second illumination light beam 412L after passing the optical structure 451.

In the third embodiment, to increase a total depth of field (DOF) of the optical navigation device 400, the first crossover region is farther away from the substrate 40 than the second crossover region, e.g., respectively forming a first depth of field DOF1 (or called a first working range) and a second depth of field DOF2 (or called a second working range). The total DOF of the optical navigation device 400 is equal to DOF1+DOF2. It should be mentioned that lengths of DOF1 and DOF2 are not limited to those shown in FIG. 4. Furthermore, to make the working range of the optical navigation device 400 continuous, preferably the first working range DOF1 is partially overlapped with the second working range DOF2 in a longitudinal direction (e.g., up and down directions), but not limited thereto.

Furthermore, a crossover point (e.g., the highest position) between the second crossover region and the FOV (e.g., shown by the center line FOVc) is at a predetermined distance under a bottom surface of the light directing member 45 so as to determine a minimum working DOF of the optical navigation device 400. That is, when a work surface is above the minimum work DOF (e.g., shown as a BL region), reflected light from the work surface does not enter the aperture AP of the light sensor 43 and thus is not received by the light sensor 43.

In this embodiment, a first included angle $\theta1$ between the first illumination light beam 411L and a normal (e.g., vertical line in FIG. 4) of the substrate 40 is smaller than a second included angle $\theta2$ between the second illumination light beam 412L and the normal of the substrate 40 to cause DOF1 and DOF2 have a position deviation in the longitudinal direction. In this way, DOF1+DOF2 is larger than either DOF1 or DOF2. If the first light source 411 is a reference light source, the working range at a near field side of the optical navigation device 400 is extended by further arranging a second light source 412. On the contrary, if the second light source 412 is a reference light source, the working range at a far field side of the optical navigation device 400 is extended by further arranging a first light source 411.

Figure 5:
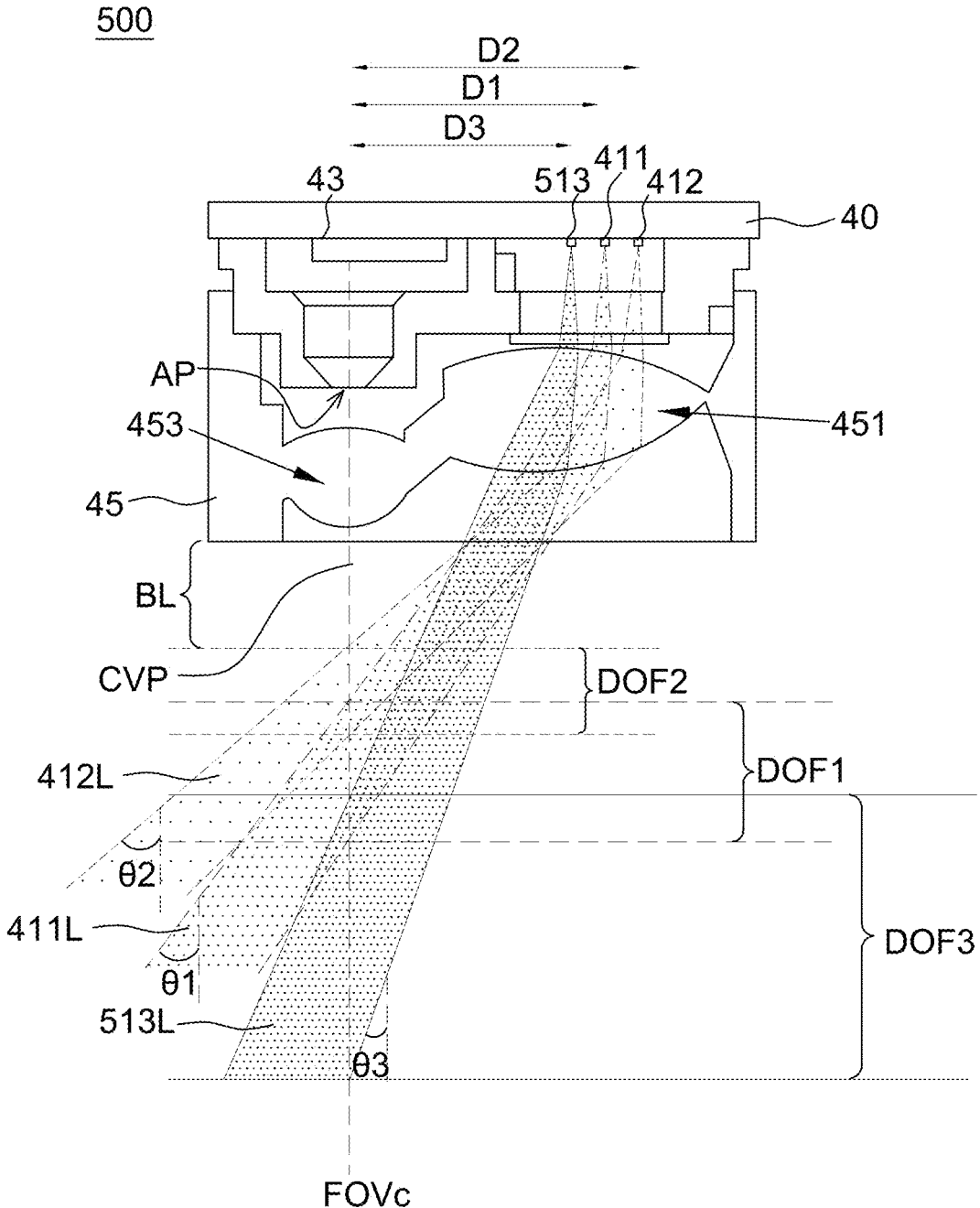
FIG. 5 is a schematic diagram of an optical navigation device according to a fourth embodiment of the present disclosure.

Please refer to FIG. 5, it is a schematic diagram of an optical navigation device 500 according to a fourth embodiment of the present disclosure. The difference between the fourth embodiment and the third embodiment is that the fourth embodiment further includes a third light source 513 arranged at the same side of the light sensor 43 as the first light source 411 on the substrate 40, wherein components identical to those in the third embodiment are indicated by identical reference numerals to simplify illustrations.

In the fourth embodiment, the second light source 412 and the third light source 513 are arranged at a connection line between the first light source 411 and the light sensor 43, wherein the third light source 513 has a third transverse distance D3, smaller than the first transverse distance D1, from the light sensor 43; and the second light source 412 has a second transverse distance D2, larger than the first transverse distance D1, from the light sensor 43.

The third light source 513 is selected from a coherent light source and a non-coherent light source without particular limitations. Emission light of the third light source 513 is refracted by the light directing member 45 to propagate toward (e.g., lower left direction) the light sensor 43 after passing the light directing member 45 to form a third illumination light beam 513L, which has a third crossover region (e.g., a longitudinal region that FOVc inside 513L, e.g., DOF3) with the FOV of the light sensor 43.

In the fourth embodiment, to increase a total depth of field (DOF) of the optical navigation device 500, the first crossover region is closer to the substrate 40 than the third crossover region, e.g., respectively forming a first depth of field DOF1 (or called a first working range) and a third depth of field DOF3 (or called a third working range). The total DOF of the optical navigation device 500 is equal to DOF1+DOF2+DOF3. It should be mentioned that lengths of DOF1, DOF2 and DOF3 are not limited to those shown in FIG. 5. Furthermore, to make the working range of the optical navigation device 500 continuous, preferably the first working range DOF is partially overlapped with the third working range DOF3 in the longitudinal direction, but not limited thereto.

In this embodiment, a first included angle $\theta1$ between the first illumination light beam 411L and a normal (e.g., vertical line in FIG. 5) of the substrate 40 is smaller than a second included angle $\theta2$ between the second illumination light beam 412L and the normal of the substrate 40; and a first included angle $\theta1$ between the first illumination light beam 411L and the normal of the substrate 40 is larger than a third included angle $\theta3$ between the third illumination light beam 513L and the normal of the substrate 40. In this way, DOF1+DOF2+DOF3 is larger than either DOF1, DOF2 or DOF3.

In this way, if the first light source 411 is a reference light source, the working range at a near field side of the optical navigation device 500 is extended by further arranging a second light source 412; and the working range at a far field side of the optical navigation device 500 is extended by further arranging a third light source 513.

In this embodiment, the first light source 411, the second light source 412 and the third light source 513 are singulated dice attached in an array, a monolithic array of discrete light sources which are electrically isolated, a monolithic array of light sources in continuum which are not electrically isolated, or three individual light sources arranged in parallel to a line connecting the light sensor 43 and the first light source 411.

In the present disclosure, it is possible to arrange more than three light sources on the substrate 40 in a line to extend the total DOF, wherein the light source closer to the light sensor 43 is used to extend a far field working range; whereas the light source farther away from the light sensor 43 is used to extend a near field working range.

As mentioned above, the conventional navigation device has a short operable depth of field (DOF) such that it is difficult to be adapted to applications requiring a large DOF.

Accordingly, the present disclosure further provides an optical navigation device (e.g., FIGS. 2 and 3) that arrange multiple light sources to form different illumination ranges at different longitudinal heights within a field of view of a light sensor so as to increase a total DOF of the optical navigation device.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical navigation device, comprising:
a substrate;
a light directing member;
a light sensor, arranged on the substrate and having a field of view (FOV) perpendicular to the substrate;
a first light source, arranged on the substrate, and emission light thereof being refracted by the light directing member to propagate toward the light sensor after passing the light directing member to form a first illumination light beam, which has a first crossover region with the FOV; and
a second light source, arranged on the substrate at a same side of the light sensor with the first light source, and emission light of the second light source being refracted by the light directing member to propagate toward the light sensor after passing the light directing member to form a second illumination light beam, which has a second crossover region with the FOV,
wherein the first crossover region is closer to the substrate than the second crossover region.

2. The optical navigation device as claimed in claim 1, wherein the light directing member comprises:
a first optical structure, the emission light of the first light source forming the first illumination light beam after passing the first optical structure; and
a second optical structure, the emission light of the second light source forming the second illumination light beam after passing the second optical structure,
wherein an incident surface and an exit surface of the first optical structure are different from those of the second optical structure.

3. The optical navigation device as claimed in claim 2, wherein the light directing member further comprises a lens member opposite to the light sensor, and an optical axis of the lens member is perpendicular to the substrate.

4. The optical navigation device as claimed in claim 3, wherein the first optical structure, the second optical structure and the lens member are formed integrally.

5. The optical navigation device as claimed in claim 3, wherein the first optical structure, the second optical structure and the lens member are formed individually.

6. The optical navigation device as claimed in claim 2, wherein the first optical structure and the second optical structure are selected from the group consisting of a collimating lens, a non-collimating lens, a combination of a convex lens and an optical wedge, a combination of a convex lens and a multi-facet lens, a combination of a Fresnel lens and a multi-facet lens, and a combination of a Fresnel lens and a Fresnel lens.

7. The optical navigation device as claimed in claim 1, wherein a crossover point between the first crossover region and the FOV is at a predetermined distance under a bottom surface of the light directing member to determine a minimum working depth of field of the optical navigation device.

8. The optical navigation device as claimed in claim 1, wherein the emission light of the first light source and the emission light of the second light source are not overlapped inside the light directing member.

9. The optical navigation device as claimed in claim 1, wherein
the first light source is separated from the light sensor by a first transverse distance,
the second light source is separated from the light sensor by a second transverse distance,
the first transverse distance is smaller than the second transverse distance, and
a first included angle between the first illumination light beam and a normal of the substrate is different from a second included angle between the second illumination light beam and the normal of the substrate.

10. An optical navigation device, comprising:
a substrate;
a light directing member;
a light sensor, arranged on the substrate and having a field of view (FOV) perpendicular to the substrate,
a first light source, arranged on the substrate, and emission light thereof being refracted by the light directing member to propagate toward the light sensor after passing the light directing member to form a first illumination light beam, which has a first crossover region with the FOV; and
a second light source, arranged on the substrate at different sides of the light sensor from the first light source, and emission light of the second light source being refracted by the light directing member to propagate toward the light sensor after passing the light directing member to form a second illumination light beam, which has a second crossover region with the FOV,
wherein the first crossover region is closer to the substrate than the second crossover region.

11. The optical navigation device as claimed in claim 10, wherein the light directing member comprises:
a first optical structure, the emission light of the first light source forming the first illumination light beam after passing the first optical structure; and
a second optical structure, the emission light of the second light source forming the second illumination light beam after passing the second optical structure,
wherein an incident surface and an exit surface of the first optical structure are different from those of the second optical structure.

12. The optical navigation device as claimed in claim 11, wherein the light directing member further comprises a lens member opposite to the light sensor, and an optical axis of the lens member is perpendicular to the substrate.

13. The optical navigation device as claimed in claim 12, wherein the first optical structure, the second optical structure and the lens member are formed integrally, or individually.

14. The optical navigation device as claimed in claim 11, wherein the first optical structure and the second optical structure are selected from the group consisting of a collimating lens, a non-collimating lens, a combination of a convex lens and an optical wedge, a combination of a convex lens and a multi-facet lens, a combination of a Fresnel lens and a multi-facet lens, and a combination of a Fresnel lens and a Fresnel lens.

15. The optical navigation device as claimed in claim 10, wherein a crossover point between the first crossover region and the FOV is at a predetermined distance under a bottom surface of the light directing member to determine a minimum working depth of field of the optical navigation device.

16. The optical navigation device as claimed in claim 10, wherein the emission light of the first light source and the emission light of the second light source are not overlapped inside the light directing member.

17. The optical navigation device as claimed in claim 10, wherein the first light source is separated from the light sensor by a first transverse distance, the second light source is separated from the light sensor by a second transverse distance, the first transverse distance is equal to the second transverse distance, and a first included angle between the first illumination light beam and a normal of the substrate is larger than a second included angle between the second illumination light beam and the normal of the substrate.

18. The optical navigation device as claimed in claim 10, wherein the first light source is separated from the light sensor by a first transverse distance, the second light source is separated from the light sensor by a second transverse distance, the first transverse distance is smaller than the second transverse distance, and a first included angle between the first illumination light beam and a normal of the substrate is equal to a second included angle between the second illumination light beam and the normal of the substrate.

19. An optical navigation device, comprising:

a substrate;

a light directing member, comprising a first optical structure and a second optical structure formed individually from each other;

a light sensor, arranged on the substrate and having a field of view (FOV) perpendicular to the substrate;

a first light source, arranged on the substrate, and emission light thereof being refracted by the light directing member to propagate toward the light sensor after passing the light directing member to form a first illumination light beam; and a second light source, arranged on the substrate, and emission light thereof being refracted by the light directing member to propagate toward the light sensor after passing the light directing member to form a second illumination light beam, wherein when a work surface is within a first working range, a first illumination area of the first illumination light beam on the work surface is closer to an FOV center of the light sensor than a second illumination area of the second illumination light beam on the work surface, and when the work surface is within a second working range, the first illumination area of the first illumination light beam on the work surface is farther away from the FOV center of the light sensor than the second illumination area of the second illumination light beam on the work surface, wherein the first working range is closer to the substrate than the second working range.

20. The optical navigation device as claimed in claim 19, wherein the light sensor is configured to receive diffuse reflection light of the first illumination light beam and the second illumination light beam.

21. An optical navigation device, comprising:

a substrate;

a light directing member;

a light sensor, arranged on the substrate and having a field of view (FOV) perpendicular to the substrate;

a first light source, arranged on the substrate and having a first transverse distance from the light sensor, and emission light thereof being refracted by the light directing member to propagate toward the light sensor after passing the light directing member to form a first illumination light beam, which has a first crossover region with the FOV; and a second light source, arranged on the substrate at the same side of the light sensor as the first light source and having a second transverse distance, larger than the first transverse distance, from the light sensor, and emission light of the second light source being refracted by the light directing member to propagate toward the light sensor after passing the light directing member to form a second illumination light beam, which has a second crossover region with the FOV, wherein the first crossover region is farther away from the substrate than the second crossover region.

22. The optical navigation device as claimed in claim 21, wherein the light directing member comprises:

an optical structure, the emission lights of the first light source and the second light source respectively forming the first illumination light beam and the second illumination light beam after passing the optical structure; and a lens member, opposite to the light sensor, and an optical axis of the lens member being perpendicular to the substrate.

23. The optical navigation device as claimed in claim 21, further comprising:

a third light source, arranged on the substrate at the same side of the light sensor as the first light source and having a third transverse distance, smaller than the first transverse distance, from the light sensor, and emission light of the third light source being refracted by the light directing member to propagate toward the light sensor after passing the light directing member to form a third illumination light beam, which has a third crossover region with the FOV, wherein the first crossover region is closer to the substrate than the third crossover region.

24. The optical navigation device as claimed in claim 21, wherein the first crossover region defines a first working range and the second crossover region defines a second working range, and the first working range is partially overlapped with the second working range in a longitudinal direction.

25. The optical navigation device as claimed in claim 21, wherein the first light source and the second light source are singulated dice attached in an array, a monolithic array of discrete light sources which are electrically isolated, or a monolithic array of light sources in continuum which are not electrically isolated.

* * * * *